(12) United States Patent
Salzmann et al.

(10) Patent No.: US 10,093,142 B2
(45) Date of Patent: Oct. 9, 2018

(54) VEHICLE

(71) Applicants: Karl Salzmann, Ginsheim (DE); Knud Ball, Budenheim (DE)

(72) Inventors: Karl Salzmann, Ginsheim (DE); Knud Ball, Budenheim (DE)

(73) Assignee: iOLS GmbH, Offenbach (DE)

( * ) Notice: Subject to any disclaimer, the term of this patent is extended or adjusted under 35 U.S.C. 154(b) by 0 days.

(21) Appl. No.: 14/350,304

(22) PCT Filed: Dec. 19, 2012

(86) PCT No.: PCT/DE2012/100390
§ 371 (c)(1),
(2) Date: Apr. 7, 2014

(87) PCT Pub. No.: WO2013/097844
PCT Pub. Date: Jul. 4, 2013

(65) Prior Publication Data
US 2014/0251705 A1  Sep. 11, 2014

(30) Foreign Application Priority Data
Dec. 27, 2011  (DE) .................. 10 2011 057 062

(51) Int. Cl.
*B60G 13/14* (2006.01)
*B60L 11/00* (2006.01)
(Continued)

(52) U.S. Cl.
CPC ............ *B60G 13/14* (2013.01); *B60G 13/18* (2013.01); *B60G 17/06* (2013.01); *B60L 11/002* (2013.01);
(Continued)

(58) Field of Classification Search
CPC .. Y02T 10/7077; Y02T 10/7083; B60L 11/00; B60L 11/002; B60K 16/00; B60G 13/14; B60G 13/18; F16F 6/00
See application file for complete search history.

(56) References Cited

U.S. PATENT DOCUMENTS 1,371,124 A * 3/1921 Spangler ..................... 267/221
4,319,745 A * 3/1982 Pinard .................. G06K 13/04
271/305
(Continued)

FOREIGN PATENT DOCUMENTS

CN       2 679 391       2/2005
DE   20 2006 002854      8/2007
(Continued)

OTHER PUBLICATIONS

Search Report and Written Opinion dated Jul. 17, 2014 issued in the corresponding International Patent Application No. PCT/DE2012/100390.
(Continued)

*Primary Examiner* — Frank B Vanaman
(74) *Attorney, Agent, or Firm* — Cozen O'Connor

(57) ABSTRACT

A vehicle, particularly motor vehicle, having a plurality of wheels that form unsprung structural component parts rotatable around wheel axles and a vehicle body forming a sprung structural component part. An energy generation device is arranged in the vehicle body by which a movement of the vehicle body or of parts of the vehicle body can be converted into electrical energy supplied to a storage battery. The energy generation device is an energy absorption converter and has a cylindrical coil winding which surrounds an interior space in which an axially magnetized permanent
(Continued)

magnet is arranged such that it can be driven so as to be coaxially movable by the movement of the vehicle body or of a part of the vehicle body.

19 Claims, 4 Drawing Sheets

(51) Int. Cl.
| | | |
|---|---|---|
| *B60G 13/18* | (2006.01) | |
| *B60G 17/06* | (2006.01) | |
| *F16F 6/00* | (2006.01) | |

(52) U.S. Cl.
CPC .......... *F16F 6/00* (2013.01); *B60G 2204/128* (2013.01); *B60G 2204/129* (2013.01); *B60G 2204/421* (2013.01); *B60G 2300/60* (2013.01)

(56) References Cited

U.S. PATENT DOCUMENTS

| | | | |
|---|---|---|---|
| 4,380,931 A * | 4/1983 | Frost | G01N 29/222 73/598 |
| 4,500,827 A * | 2/1985 | Merritt et al. | 322/3 |
| 4,595,849 A * | 6/1986 | Cuenoud | H02K 33/06 310/36 |
| 4,648,915 A * | 3/1987 | Ibata | H01F 1/04 148/101 |
| 4,710,713 A * | 12/1987 | Strikman | G01V 3/32 324/303 |
| 4,981,309 A | 1/1991 | Froeschle et al. | |
| 5,590,734 A * | 1/1997 | Caires | 180/165 |
| 6,737,789 B2 * | 5/2004 | Radziemski | H01L 41/1875 310/319 |
| 7,161,254 B1 * | 1/2007 | Janky et al. | 290/1 R |
| 7,994,648 B1 * | 8/2011 | Fielek | 290/1 R |
| 2004/0075236 A1 * | 4/2004 | Radamis | 280/124.158 |
| 2005/0088059 A1 * | 4/2005 | Ohkubo | H02N 2/186 310/319 |
| 2006/0016629 A1 * | 1/2006 | Huard | 180/65.1 |
| 2006/0125325 A1 * | 6/2006 | Beaulieu | 310/12 |
| 2006/0237968 A1 * | 10/2006 | Chandrasekaran, Sr. | 290/1 R |
| 2007/0089919 A1 * | 4/2007 | de la Torre et al. | 180/65.2 |
| 2007/0175716 A1 | 8/2007 | Kim et al. | |
| 2010/0219798 A1 | 9/2010 | Namuduri | |
| 2010/0262308 A1 | 10/2010 | Anderson | |
| 2011/0227425 A1 | 9/2011 | Sohn | |

FOREIGN PATENT DOCUMENTS

| | | |
|---|---|---|
| DE | 10 2009 036731 | 4/2010 |
| JP | 61-74277 | 5/1986 |
| JP | 03-273858 | 12/1991 |
| JP | 11-119907 | 4/1999 |
| JP | 2007-195364 | 8/2007 |
| JP | 2007-221984 | 8/2007 |
| JP | 2008-202253 | 9/2008 |
| JP | 2009-247102 | 10/2009 |

OTHER PUBLICATIONS

Office Action dated Mar. 29, 2016 which issued in the corresponding Japanese Patent Application No. 2014-540320.

* cited by examiner

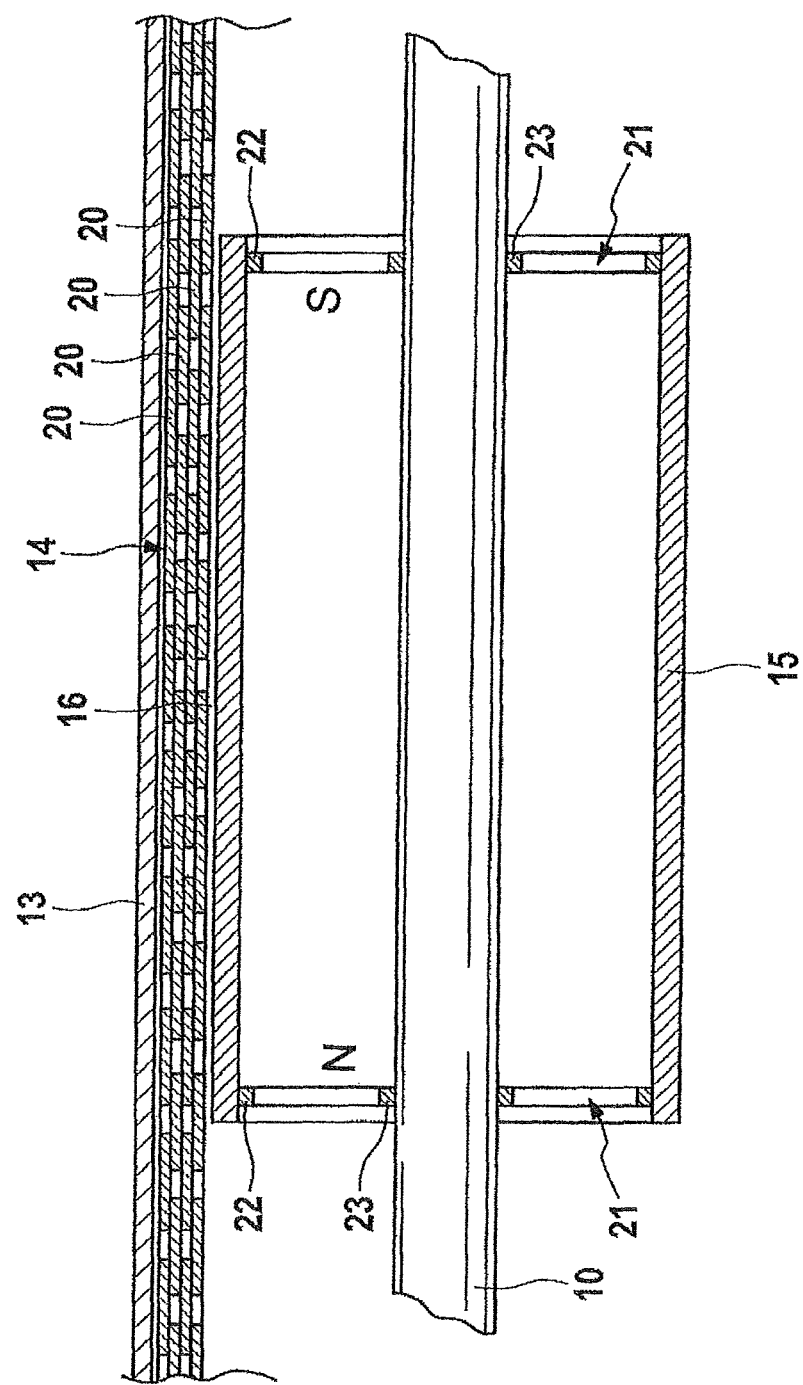

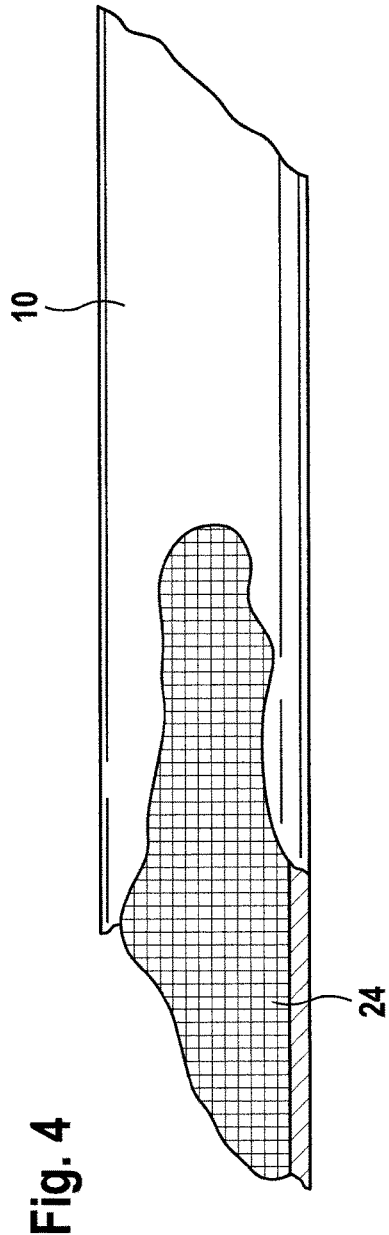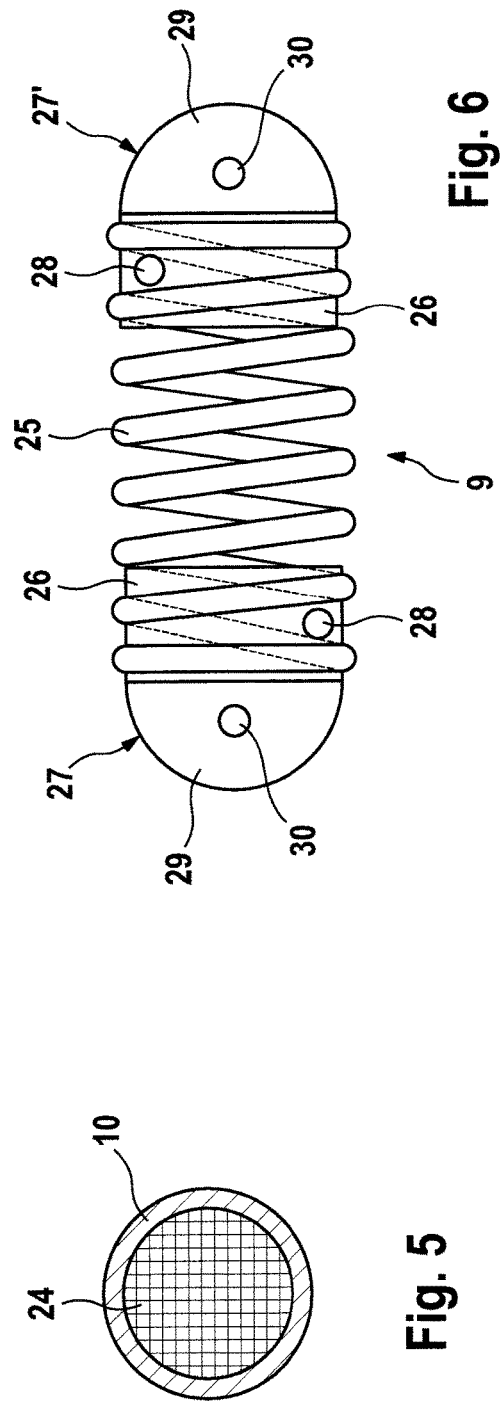

VEHICLE

CROSS REFERENCE TO RELATED APPLICATIONS

This is a U.S. national stage of application No. PCT/DE2012/100390, filed on Dec. 19, 2012. Priority is claimed on Application No.: DE102011057062.4, filed Dec. 27, 2011; the content of which is incorporated herein by reference.

BACKGROUND OF THE INVENTION

Field of the Invention

The invention is directed to a vehicle, particularly motor vehicle, having a plurality of wheels that form unsprung structural component parts and are rotatable around wheel axles and a vehicle body that forms a sprung structural component part, with an energy generation device arranged in the vehicle body by which a movement of the vehicle body or of parts of the vehicle body can be converted into electrical energy and supplied to a storage battery.

SUMMARY OF THE INVENTION

It is an object of one aspect of the invention to provide a motor vehicle in which a charging of the storage battery takes place by an energy generation device constructed in a simple manner and which works with high efficiency.

According to one aspect of the invention the energy generation device is an energy absorption converter that has a cylindrical coil winding which surrounds an interior space in which an axially magnetized permanent magnet is arranged such that it can be driven to be coaxially movable by the movement of the vehicle body or of a part of the vehicle body. In this way, the stroke of the relative movement between sprung part and unsprung part can be transmitted to the permanent magnets in an increased manner.

By this construction, an AC voltage is generated through induction due to the reciprocated permanent magnets. The AC voltage is rectified without reverse current for the coil winding through fast diodes having low forward voltage. The DC voltage charges a capacitor arrangement with a charging current. Aside from smoothing the induced high-frequency voltage pulses, the capacitor voltage acts as an impedance converter. Due to a low internal resistance of the capacitor arrangement, it is the element through which a current is converted from the induced voltage for charging the storage battery. A recharging of the storage battery takes place autonomously and compulsorily in the vehicle. A recharging device outside of the vehicle and, therefore, a corresponding recharging infrastructure can be dispensed with.

Due to the strict separation between voltage induction and subsequent conversion into current, no magnetic counterforces are generated that affect the energy absorption converter, so the efficient energy yield and, therefore, the degree of efficiency are very high.

No special forces need be applied for moving the permanent magnet; rather, the movements occur through use of the vehicle and which act on the vehicle are transferred to the permanent magnet to move it coaxially in the coil winding.

The relative stroke between the sprung parts and unsprung parts of the vehicle can be transmitted to the permanent magnet or permanent magnets in an increased manner by the one or more gear units. A simple construction results when the gear unit or gear units are lever-type gear units.

An increase in generated energy results when a coil winding package comprising a plurality of coil windings of different diameter arranged radially one above the other is arranged in a mutually coaxial manner, the permanent magnet being arranged so as to be coaxially movable in the radially innermost coil winding thereof.

An increase in the generated energy likewise arises when a plurality of coil windings or coil winding packages are arranged coaxial to one another, wherein an axially magnetized permanent magnet is arranged in each coil winding or in each coil winding package so as to be coaxially movable.

A negative influence of the force of gravity on the permanent magnet is prevented in that the coils or coil packages extend approximately horizontally. In this regard, the coils or coil packages can extend in the driving direction of the vehicle and/or transverse thereto.

Because the permanent magnet or permanent magnets can be driven to be coaxially movable in the coil winding or coil windings or coil winding packages by vertical movements of sprung parts and unsprung parts of the vehicle relative to one another, these relative movements which occur through use of the vehicle are utilized to drive the permanent magnet. By reason of their weight, these sprung parts, e.g., the vehicle body or parts thereof, which are supported by springs at the unsprung parts, e.g., the wheel axles, can move relative to the unsprung parts, during driving operation, particularly over uneven roadways, through accelerations and braking of the vehicle, through centrifugal forces when cornering, through cross wind impinging on the vehicle or reactions of the vehicle to load change, and these relative movements are utilized for movably driving the permanent magnet.

During driving operation, the chassis of the vehicle continually compensates for irregularities of the traveled roadway or neutralize them as far as possible. Because of the vehicle weight and the continual adaptation of the chassis, energy is brought about which is freely available and can be converted into electrical energy by the energy absorption converter and supplied to the storage battery.

When a vehicle is stationary, relative movements of this kind occur when the vehicle is loaded or when persons enter the vehicle.

Advantageously, the permanent magnet or permanent magnets in the coil winding or coil windings or coil winding packages are driven so as to be coaxially movable by vertical movements of a wheel and the vehicle body relative to one another.

To transmit the stroke of the relative movement between sprung part and unsprung part to the permanent magnet in an increased manner, the vertical movements of sprung parts and unsprung parts of the vehicle relative to one another can be transmissible from the unsprung part or unsprung parts to the permanent magnet or permanent magnets via one or more gear units, preferably the relative stroke between the sprung parts and unsprung parts of the vehicle can be transmitted to the permanent magnet or permanent magnets in an increased manner by the gear unit or gear units.

A simple construction results when the gear unit or gear units are lever-type gear units.

A further gain in energy is achieved in that the permanent magnet or permanent magnets in the coil winding or coil windings or coil winding packages can be driven to be coaxially movable by positive and/or negative accelerations and/or centrifugal forces and/or gravitational forces acting on the vehicle body or on a part of the vehicle body.

A radially compact constructional size results when the coil winding is a copper conductor arranged on an electrically insulating carrier sheet.

The copper conductor is preferably made at least substantially of pure copper. Owing to the nonmagnetic copper, there is no magnetic force acting on the coil winding so that there is also no electrical generation of heat.

A small radial structural size is achieved when the coil windings of a coil winding package are arranged on electrically insulating carrier sheets of a multilayer sheet, and the individual coils are electrically insulated from one another at the same time.

High generation of energy and low weight result when one or more of the permanent magnets is arranged on a magnet carrier tube that can be driven to be coaxially movable in the cylindrical coil winding or coil winding package, and there is an air gap between the permanent magnet or permanent magnets and the cylindrical coil winding or coil winding package.

A particularly simple, low-weight construction results when one or more of the permanent magnets is formed as a magnet tube which can be driven so as to be coaxially movable in the cylindrical coil winding or coil winding package, and there is an air gap between the cylindrical lateral surface of the magnet tube or magnet tubes and the cylindrical coil winding or coil winding package.

The smaller the air gap, the higher the energy that can be generated. The air gap need only be large enough that no friction occurs between the permanent magnet and the cylindrical coil winding so as to prevent generation of heat.

When the wall thickness of the magnet tube is relatively small, the latter generates a magnetic field having fax lines that run approximately parallel and homogeneously so that a high efficiency is achieved.

To prevent friction heat in a more reliable manner, the outer circumference of the magnet carrier tube and of the permanent magnet or permanent magnets or of the magnet tube can be covered with an anti-friction layer, and the anti-friction layer can be a PTFE layer (polytetrafluoroethylene layer) which is applied particularly by nanotechnology.

To increase efficiency, the permanent magnet or permanent magnets are advantageously permanent hard magnets.

To achieve a compact construction that economizes on installation space, the permanent magnet or permanent magnets can be arranged on a stroke bar that projects coaxially through the coil winding or coil winding package and can be driven so as to be coaxially movable through the movement of the vehicle body or of a part of the vehicle body, and the stroke bar can be a stroke tube so as to economize on weight.

To further reduce weight without loss of stability, the stroke tube is a material having a lower specific weight than steel, particularly titanium or a titanium alloy.

To increase bending stiffness, without substantially increasing weight, a supporting structure comprising a material which has a lower specific weight than steel and which can be a honeycomb structure and can be made of carbon can be arranged in the interior of the stroke tube.

As a result of this bending stiffness, a mechanical friction of the permanent magnets at the coil winding and, therefore, generation of heat are largely prevented even if the stroke tubes are relatively long so that the permanent magnets are axially movable in the coil winding in a floating manner.

To fasten the magnet carrier tube or magnet tube to the stroke bar or stroke tube, the magnet carrier tube or the magnet tube can be arranged on the stroke bar or stroke tube via carrier parts which are arranged particularly in the axial end regions of magnet carrier tube or magnet tube.

The carrier parts can be at least substantially axially permeable to air so that air resistances do not impair the ability of the permanent magnets to move axially as freely as possible.

The carrier parts can be made of plastic to reduce weight.

For purposes of axial movement, the magnet carrier tube or the magnet tube is bearing-mounted so as to be coaxially movable, and the bearing resistances are especially low when the magnet carrier tube or the magnet tube is supported so as to be coaxially movable in sliding rolling element bearings.

When the motor vehicle has an electric motor as drive which is supplied with power by the storage battery, the drive energy can be generated at least substantially, if not completely, in an autonomous manner without emissions, particularly without $CO_2$ emissions, in the motor vehicle.

Due to the highly efficient generation of energy, relatively large and, under some circumstances, even unlimited ranges of the motor vehicle can be achieved.

The permanent magnet or permanent magnets or the stroke bar or the stroke tube can be drivable so as to be movable coaxial to the coil winding or to the coil winding package via an axially springing spring element. By this springing coupling connection, the drive stroke is lengthened by an additional stroke so that additional inductive work can be obtained. Further, the spring element also absorbs impact forces and tensile forces at the stroke bar or stroke tube and accordingly reduces the loading of the joint mechanisms connecting to the drive mechanism of the vertical movements.

When the permanent magnets are driven to movement by positive and/or negative accelerations and/or centrifugal forces and/or gravitational forces acting on the vehicle body or on a part of the vehicle body, the permanent magnet or permanent magnets which are coaxially movable in the coil winding are acted upon by an axially springing spring element.

The spring element can be a tension spring or a tension/compression spring, particularly a helical tension spring or helical tension/compression spring.

The vehicle can have a chassis or a box-type frame with a floor area in which is arranged one or more cylindrical coil windings or coil winding packages in which the axially magnetized permanent magnets are drivably arranged so as to be coaxially movable.

BRIEF DESCRIPTION OF THE DRAWINGS

Embodiment examples of the invention are shown in the drawings and are described more fully in the following. The drawings show:

FIG. 3 is an enlarged section of the energy absorber converter according to FIGS. 1 and 2;

FIG. 4 is an enlarged side view of a stroke tube of the energy absorber converter according to FIGS. 1 and 2;

FIG. 5 is the stroke tube according to FIG. 4 in cross section;

FIG. 6 is a side view of a tension/compression spring element of the energy absorber converter according to FIGS. 1 and 2.

DETAILED DESCRIPTION OF THE PRESENTLY PREFERRED EMBODIMENTS

Figure 1:
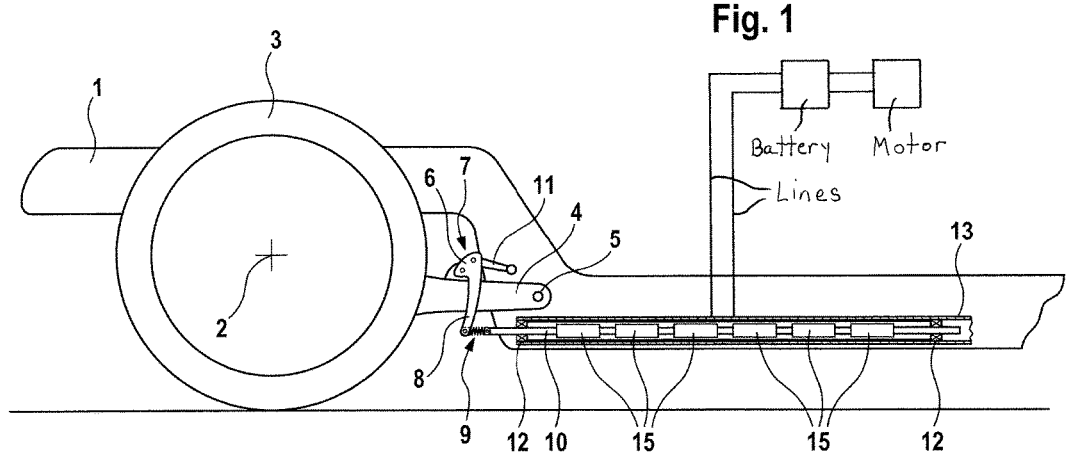
FIG. 1 is a schematic diagram of a section of a motor vehicle with a first energy absorber converter.

In FIG. 1, a chassis 1 of a motor vehicle is supported at a wheel axle 2 of a wheel 3 via spring units, not shown, so that there are vertical movements of chassis 1 and wheel axle 2 relative to one another when the motor vehicle is used.

The wheel axle 2 is articulated at the chassis 1 via rear axle longitudinal link 4 so as to be swivelable around a swiveling axis 5 transverse to the longitudinal extension of the motor vehicle.

The free end of a small lever arm 6 of a two-armed lever 7 is articulated at the rear axle link 4 and is movable approximately vertically by swiveling movements of the rear axle longitudinal link 4.

The free end of the large lever arm 8 of a two-armed lever 7 extends approximately perpendicularly and is connected via a tension/compression spring element 9 to an end of a stroke tube 10 which is directed in the longitudinal extension of the vehicle.

The connection area of the small lever arm 6 and large lever arm 8 is articulated at the chassis 1 via a coupling 11 that is directed approximately in longitudinal extension of the vehicle.

If relative movements of the wheel axle 2 and chassis 1 occur during driving operation of the motor vehicle or due to loading or unloading of the motor vehicle, the approximately vertical stroke exerted on the small lever arm 6 by the rear axle longitudinal link 4 is transmitted by the lever-type gear unit formed by the two-armed lever 7 and coupling 11 to the stroke tube 10 as a larger approximately horizontal stroke via the tension/compression spring element 9.

The stroke tube 10 is supported by the sliding rolling element bearing 12 to be coaxially movable in an inductor tube 13, and the inductor tube 13, which is made of aluminum, is arranged in the floor area of the chassis 1 by grommets, not shown, of thermoplastic rubber.

A coil winding package 14 is arranged at the inner wall of the inductor tube 13 and extends over the entire length of the inductor tube 13.

Six axially magnetized permanent magnets formed as magnet tubes 15 are arranged on the stroke tube 10 so as to be spaced apart, an annular air gap 16 being provided between the cylindrical lateral surface of the permanent magnets and the inner coil winding of the coil winding package 14.

Due to the reciprocating movement of the stroke tube 10 driven by the rear axle longitudinal link 4 via the two-armed lever 7, AC voltages are generated by the magnet tubes 15, which are likewise reciprocated by stroke tube 10, through induction in the coil windings of the coil winding package 14, which AC voltages are utilized for charging a storage battery of the motor vehicle.

Figure 2:
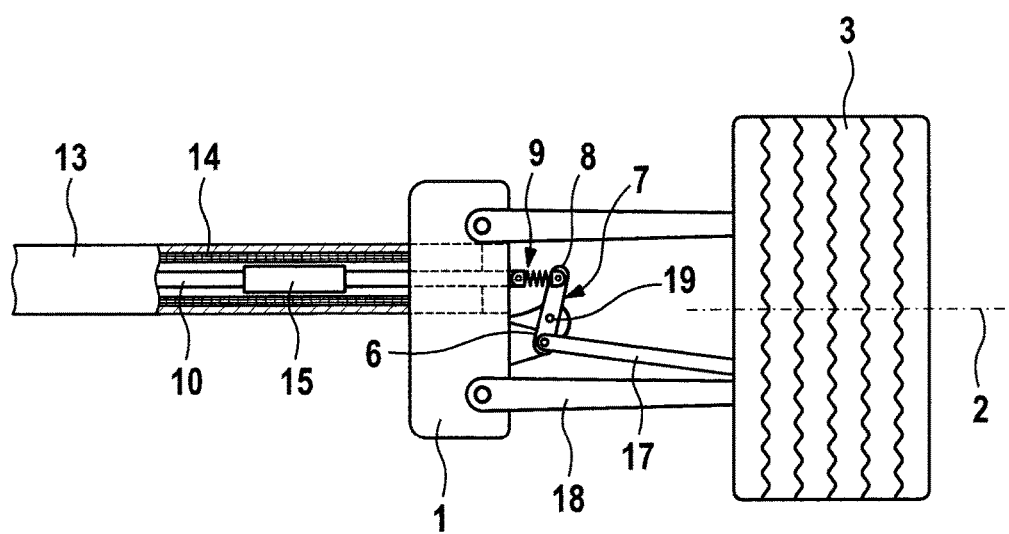
FIG. 2 is a schematic diagram of a section of a motor vehicle with a first energy absorber converter.

In the example in FIG. 2, a deflecting bar 17 is articulated by its one end in the vicinity of a wheel 3 to a front axle transverse link 18 and transmits the vertical movements of the front axle link 18 to the small lever arm 6 of a two-armed lever 7 at which the other end of the deflecting bar 17 is articulated.

The two-armed lever 17 is bearing-mounted at a part of the chassis 1 to be swivelable around an axis 19 directed in longitudinal extension of the motor vehicle.

The free end of the large lever arm 8 of the two-armed lever 7 is connected corresponding to FIG. 1 to a stroke tube 10 of pure titanium via tension/compression spring element 9.

Corresponding to FIG. 1, the stroke tube 10 is provided with magnet tubes 15 and is guided such that it can be coaxially reciprocated in an inductor tube 13 extending transverse to the longitudinal extension of the vehicle.

According to FIG. 1, the inductor tube 13 is also provided with a coil winding package 14.

The function of the embodiment example in FIG. 2 corresponds to the function of the embodiment example in FIG. 1.

As is shown in FIG. 3, the coil winding package 14 comprises a multilayer sheet that has four coil windings 20 which are arranged coaxial to one another and are in the form of applied copper conductors.

The axially magnetized magnet tubes 15 comprising permanent hard magnet material are connected at both axial ends thereof to the stroke tube 10 via a carrier part 21 of plastic.

The carrier parts 21 have an outer ring 22 connected to the cylindrical inner wall of the magnet tube 15 and an inner ring 23 connected to the stroke tube 10, the outer ring 22 and inner ring being connected to one another by spokes, not shown. Accordingly, the carrier parts 21 are substantially axially permeable to air so that substantially no movement-damping air resistance need be overcome during the axial movement or the magnet tubes 15.

Since there is also no friction resistance to be overcome between the magnet tubes 15 and coil winding package 14 through the air gap 16, the magnet tubes 15 float in the coil winding package 14 substantially without resistance.

The interior of the stroke tube 10 is filled with a honeycomb supporting structure 24 of carbon so that the stroke tube 10 is prevented very dependably from bending out of its coaxial position with low weight.

The tension/compression element 9 has a cylindrical tension/compression spring 25, A corresponding threaded part 26 of a connection piece 27 is screwed into each axial end of the tension/compression spring 25 and is prevented from coming loose by itself by a cross-pin 28 projecting radially from the threaded part 26 between two spring coils.

The connection ends 29 of the connection pieces 27, 27' which project out of the tension/compression spring 25 have a transverse bore 30 through which the one connection piece 27 is articulated to the large lever arm 8 and the other connection piece 27' is articulated to the stroke tube 10.

Of course, a plurality of inductor tubes 13 with stroke tubes 10 moveable therein can also be arranged preferably parallel to one another to increase the electrical energy that can be generated.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown anchor described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A vehicle comprising:
a wheel rotatable around a wheel axle configured as an unsprung structural component part;
a vehicle body configured as a sprung structural component part; and
an energy generation device arranged in the vehicle body, wherein movement of at least a part of the vehicle body is converted into electrical energy supplied to a storage battery,
wherein the energy generation device is an energy absorption converter having:
a cylindrical coil winding having a longitudinal axis that defines an interior space;
an axially magnetized permanent magnet arranged in the interior space and driven to be coaxially movable in the cylindrical coil winding by movements of the sprung and the unsprung parts of the vehicle relative to one another, wherein an axis of magnetization of the axially magnetized permanent magnet is coaxial to the longitudinal axis of the cylindrical coil;
wherein the movements of sprung parts and unsprung parts of the vehicle relative to one another are increased by one or more gear units, and
wherein the increased movements are transmitted to the permanent magnet via an axially-springing spring element.

2. The vehicle according to claim 1, further comprising: a coil winding package having a plurality of coil windings of different diameters arranged radially one above the other is arranged in a mutually coaxial manner, the permanent magnet being arranged to be coaxially movable in a radially innermost coil winding.

3. The vehicle according to claim 2, wherein a plurality of coil windings or a plurality of the coil winding packages are arranged coaxial to one another, wherein an axially magnetized permanent magnet is arranged to be coaxially movable in each coil winding or in each coil winding package.

4. The vehicle according to claim 2, wherein the coil windings or coil winding packages extend approximately horizontally with respect to the vehicle.

5. The vehicle according to claim 4, wherein the coil windings or coil winding packages extend in a driving direction of the vehicle.

6. The vehicle according to claim 1, wherein the permanent magnet is configured to be driven to be coaxially movable by at least one of positive accelerations, negative accelerations, centrifugal forces, and gravitational forces acting on the at least the part of the vehicle body.

7. The vehicle according to claim 1, wherein the coil winding is a copper conductor arranged on an electrically insulating carrier sheet.

8. The vehicle according to claim 1, wherein the permanent magnet is arranged on a magnet carrier tube configured to be driven to be coaxially movable in the cylindrical coil winding,
wherein an air gap is located between the permanent magnet and the cylindrical coil winding.

9. The vehicle according to claim 1, wherein the permanent magnet is formed as a magnet tube configured to be driven to be coaxially movable in the cylindrical coil winding,
wherein an air gap is located between a cylindrical lateral surface of the magnet tube and the cylindrical coil winding.

10. The vehicle according to claim 1, wherein the permanent magnet is arranged on a stroke bar that projects coaxially through the coil winding and configured to be driven to be coaxially movable through the movement of the at least the part of the vehicle body.

11. The vehicle according to claim 10, wherein the stroke bar is a stroke tube.

12. The vehicle according to claim 11, wherein the stroke tube is made from a material having a lower specific weight than steel.

13. The vehicle according to claim 1, wherein at least one of a magnet carrier tube and a magnet tube is arranged on one of a stroke bar and a stroke tube by a carrier part.

14. The vehicle according to claim 13, wherein the carrier part is substantially axially permeable to air.

15. The vehicle according to claim 1, wherein the coil winding is surrounded by an inductor tube arranged at least at a part of the vehicle body.

16. The vehicle according to claim 1, wherein a magnet carrier tube or a magnet tube is bearing-mounted so as to be coaxially movable.

17. The vehicle according to claim 1, further comprising an electric motor that is supplied with power by the storage battery.

18. The vehicle according to claim 11, wherein at least one of the stroke bar and the stroke tube are configured to be drivable to be movable coaxial to the coil winding via the axially springing spring element.

19. The vehicle according to claim 1, further comprising:
at least one of a chassis and a box-type frame; and
a floor area in which is arranged at least one cylindrical coil windings is arranged, in which the permanent magnets are drivably arranged to be coaxially movable.

* * * * *